Jan. 11, 1927.
L. E. SCHNEIDER
SANITARY BEDBUG TRAP
Filed Nov. 30, 1925
1,614,157
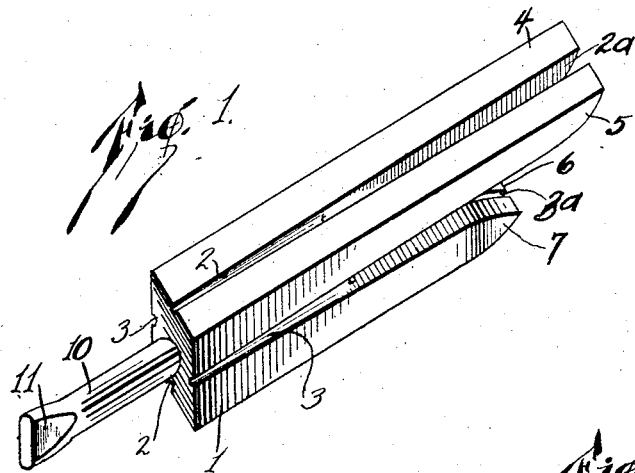
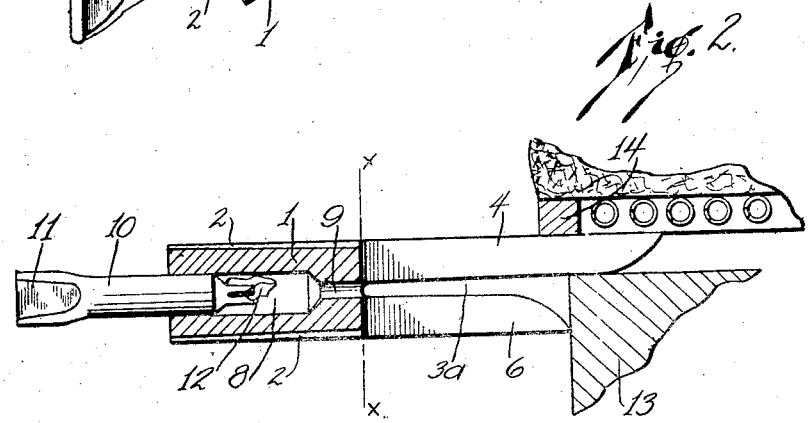
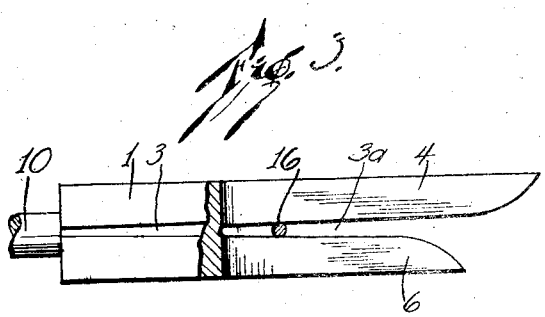
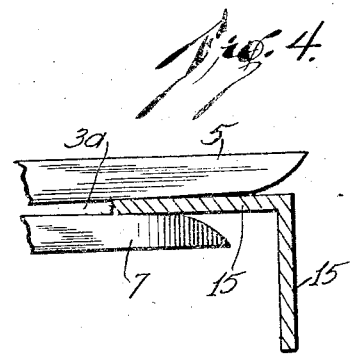
INVENTOR
L. E. Schneider
BY
ATTORNEYS Patented Jan. 11, 1927.

1,614,157

UNITED STATES PATENT OFFICE.

LEOPOLD E. SCHNEIDER, OF GALENA, ILLINOIS.

SANITARY BEDBUG TRAP.

Application filed November 30, 1925. Serial No. 72,337.

My invention relates to improvements in insect traps, and more particularly in traps designed to catch bed bugs, and it consists in the combinations, constructions, and arrangements herein described and claimed.

It is well known that bed bugs are apt to seek dark crevices, such as corners or cracks in order to hide during the daytime, as well as to find a place of seclusion where eggs can be laid. It is ordinarily quite difficult to get them out from these crevices or corners, and where insecticides are used, it often results in driving them from one place to another.

An object of my invention is to provide a trap having an interior portion in which the bugs may hide, and which may be removed for the purpose of destroying the bugs thus entrapped.

A further object of my invention is to provide a trap which can be made very cheaply, and which can be readily attached to the frame or springs of the bed, and as readily detached therefrom.

A further object of my invention is to provide means for carrying the trap, these means forming a closure for the interior portion, as well as a bait bearer.

Other objects and advantages will appear in the following specification, and the novel features of the invention will be particularly pointed out in the appended claims.

My invention is illustrated in the accompanying drawings, forming part of this application, in which—

Figure 1 is a perspective view of the device,

Figure 2 is a central longitudinal sectional view of the trap proper showing the manner in which it may be held, Figure 3 is a view showing the device as secured to a wire, and Figure 4 is a view of a portion of the device showing the manner in which it may be attached to the iron bed frame.

In carrying out my invention, I provide a main body portion 1 which is preferably made of wood. This body portion, as will be observed, is rectangular, and it has on its four faces tapering slots or grooves, such as those shown at 2 and 3, extending from one end toward the other. Forming extensions of these grooves are slots 2ª and 3ª which extend from a line designated x—x in the drawings to the opposite end of the device. These slots 2ª and 3ª form four fingers 4, 5, 6 and 7, respectively. These fingers are preferably curved or beveled at their ends, as shown in the drawings.

The body portion 1 has a cylindrical bore 8 extending from one end, and this bore has communicating therewith a small passageway 9 leading to the space between the fingers.

Arranged to fit in the bore is a handle member 10 having a finger grip portion 11. This handle member fits the bore frictionally so as to form a closure. It is provided at the end with a bait-holding member 12, which, in the present instance, may consist of a piece of cloth saturated with asafetida or some other insect-enticing substance.

From the foregoing description of the various parts of the device, the operation thereof may be readily understood. The purpose of making the fingers 6 and 7 shorter than the fingers 4 and 5 is to enable the trap to be held between two objects, such as the bed frame 13 and the frame 14, see Figure 2. The device having been provided with the bait, the fingers 4 and 5 are inserted between the mattress and the frame, the fingers 6 and 7 engaging the side of the frame, as shown. The bugs seeking a dark place of seclusion will come down on the fingers and enter the grooves or slots, and will pass through the passageway 9 into the interior 8. Here they will stay and the device may be instantly removed and the bugs destroyed either by burning the trap or plunging it into boiling water, or in any other suitable way, as by forcing the handle 10 inwardly to crush them.

The trap is designed to fit on the frame of an iron bed. In Figure 4, I have shown a portion of the bed frame 15 which is arranged to enter between the fingers 5 and 7 in the slot 3ª. In this position, the device is held frictionally but may be removed as desired. In Figure 3, the device is shown as being suspended from a wire 16, such as a portion of the wire spring.

It will be noted that the ends of the grooves 2 and 3 are comparatively shallow. The bugs will very often run to the end of the block before entering the slots and will get into the grooves 2 and 3 which will guide them down to the slots and to the passageway 9. The grooves therefore serve as an additional guideway to the slots, thus insuring the capture of bugs which otherwise might pass the slots.

I claim:

1. A bed bug trap comprising an elongated body portion having exterior grooves, and slots forming continuations of said grooves whereby spaced-apart fingers are formed, said body portion having a central bore, and a passageway at one end of said bore communicating with the slots.

2. A bed bug trap comprising an elongated body portion having exterior grooves and slots forming continuations of said grooves, whereby spaced-apart fingers are formed, said body portion having a central bore, a pasageway at one end of said bore communicating with the slots, and a handle arranged to enter the opposite end of the bore to close the latter.

3. A bed bug trap comprising a rectangular block having a bore extending inwardly from one end thereof, and being provided with longitudinal grooves on the outer face of the block and with slots forming continuations of said grooves, whereby spaced-apart fingers are provided, certain of said fingers being longer than other fingers, said block having a passageway at one end of said bore communicating with the slots, and a bait-carrying handle member arranged to close the opposite end of the bore.

LEOPOLD E. SCHNEIDER.